(12) United States Patent
Johnson et al.

(10) Patent No.: US 10,785,431 B2
(45) Date of Patent: Sep. 22, 2020

(54) IMAGE SENSORS HAVING DARK PIXELS AND IMAGING PIXELS WITH DIFFERENT SENSITIVITIES

(71) Applicant: SEMICONDUCTOR COMPONENTS INDUSTRIES, LLC, Phoenix, AZ (US)

(72) Inventors: Richard Scott Johnson, Boise, ID (US); Debashree Guruaribam, Boise, ID (US); Ross F. Jatou, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 24 days.

(21) Appl. No.: 16/200,789

(22) Filed: Nov. 27, 2018

(65) Prior Publication Data

US 2020/0169677 A1    May 28, 2020

(51) Int. Cl.
*H04N 5/359* (2011.01)
*H04N 5/355* (2011.01)

(52) U.S. Cl.
CPC ......... *H04N 5/359* (2013.01); *H04N 5/35563* (2013.01)

(58) Field of Classification Search
CPC ..................... H04N 5/359; H04N 5/35563
See application file for complete search history.

(56) References Cited

U.S. PATENT DOCUMENTS

| | | | | |
|---|---|---|---|---|
| 2005/0094005 | A1* | 5/2005 | Xu | H04N 3/1568 348/243 |
| 2005/0231606 | A1* | 10/2005 | Suzuki | H04N 5/235 348/222.1 |
| 2008/0012969 | A1* | 1/2008 | Kasai | H04N 5/23232 348/266 |
| 2009/0086069 | A1* | 4/2009 | Gomi | H01L 27/14623 348/294 |
| 2010/0026823 | A1* | 2/2010 | Sawada | G03B 7/28 348/222.1 |
| 2010/0128150 | A1* | 5/2010 | Taguchi | H04N 5/2176 348/243 |
| 2014/0014818 | A1 | 1/2014 | Cho et al. | |
| 2017/0094202 | A1* | 3/2017 | Kobayashi | H04N 5/359 |
| 2017/0133420 | A1* | 5/2017 | Silsby | H01L 27/14621 |
| 2017/0324915 | A1* | 11/2017 | Geurts | H04N 5/3532 |
| 2018/0091748 | A1 | 3/2018 | Yan | |

* cited by examiner

*Primary Examiner* — Abdelaaziz Tissire
(74) *Attorney, Agent, or Firm* — Treyz Law Group, P.C.; Joseph F. Guihan (57) ABSTRACT

An image sensor may include an array of imaging pixels. Each imaging pixel may include a first sub-pixel that is configured to generate a high light-sensitivity signal and a second sub-pixel that is configured to generate a low light-sensitivity signal. The image sensor may also include a plurality of dark pixels that are shielded from incident light and processing circuitry. The processing circuitry may be configured to, for each imaging pixel, compare a value based on at least one of the high light-sensitivity signal and the low light-sensitivity signal to a threshold, modify the high light-sensitivity signal for the respective imaging pixel based at least on the low light-sensitivity signal for the respective imaging pixel when the value is less than the threshold, and modify the high light-sensitivity signal for the respective imaging pixel based on at least one dark pixel signal when the value is greater than the threshold.

17 Claims, 6 Drawing Sheets

IMAGE SENSORS HAVING DARK PIXELS AND IMAGING PIXELS WITH DIFFERENT SENSITIVITIES

BACKGROUND

This relates generally to imaging devices, and more particularly, to imaging devices having dark pixels.

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

Typical image pixels contain a photodiode for generating charge in response to incident light. Image pixels may also include a charge storage region for storing charge that is generated in the photodiode. Image sensors can operate using a global shutter or a rolling shutter scheme. In a global shutter, every pixel in the image sensor may simultaneously capture an image, whereas in a rolling shutter each row of pixels may sequentially capture an image.

Some image sensors may include dark pixels to help correct for pixel thermally generated signal, which is unwanted and will be referred to herein as noise. The dark pixels may include photodiodes that are shielded to prevent the dark pixel photodiodes from being exposed to incident light, ensuring that any generated charge is merely noise. Dark pixels are helpful for correcting for some noise in the image sensor, but may not sufficiently correct for noise across different regions of the image sensor.

It would therefore be desirable to be able to provide improved arrangements for image sensors with dark pixels.

DETAILED DESCRIPTION

Embodiments of the present invention relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the pixels and readout circuitry for reading out image signals corresponding to the electric charge generated by the photosensitive elements.

Figure 1:
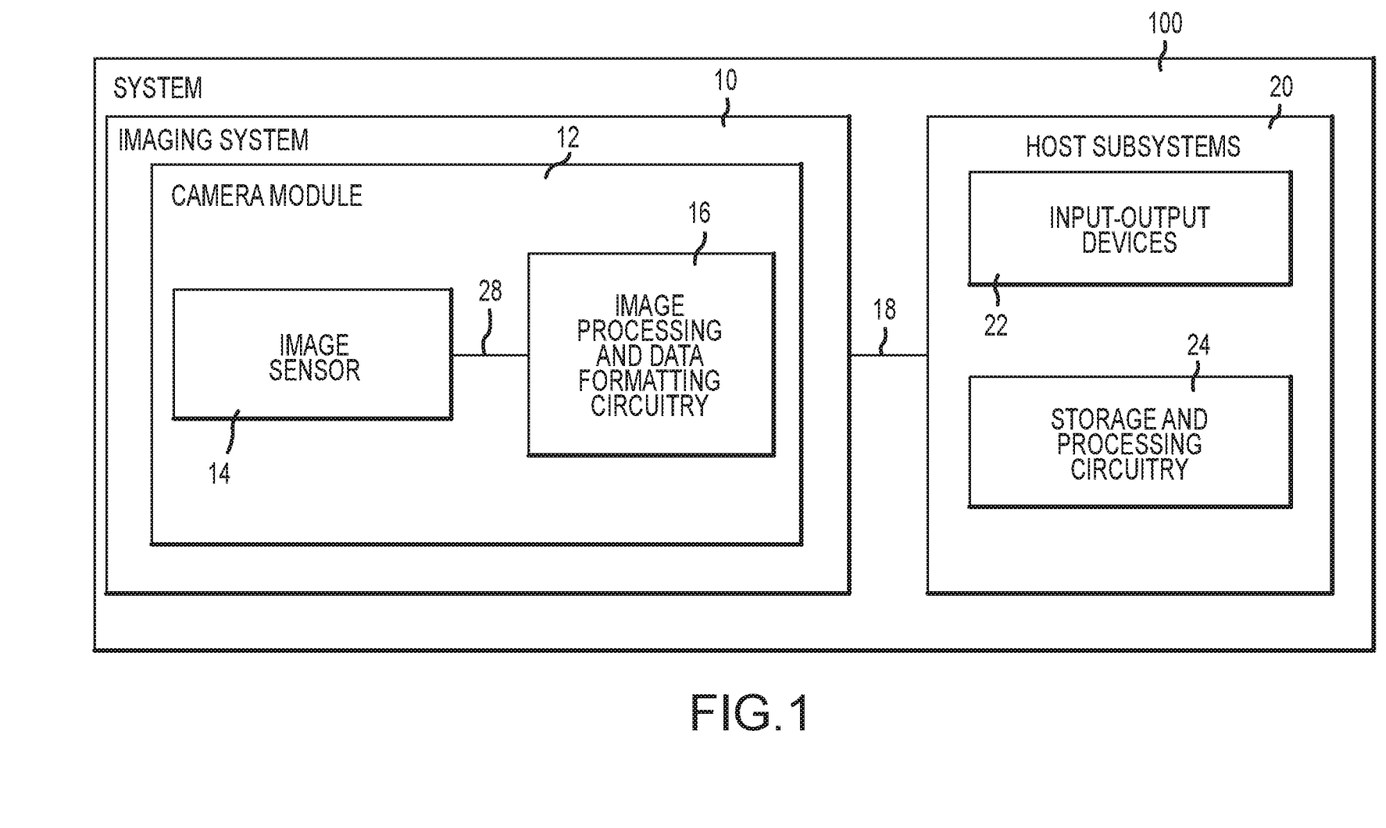
FIG. 1 is a diagram of an illustrative electronic device having an image sensor in accordance with an embodiment.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14 (such as the image sensor of FIG. 2). Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

Figure 2:
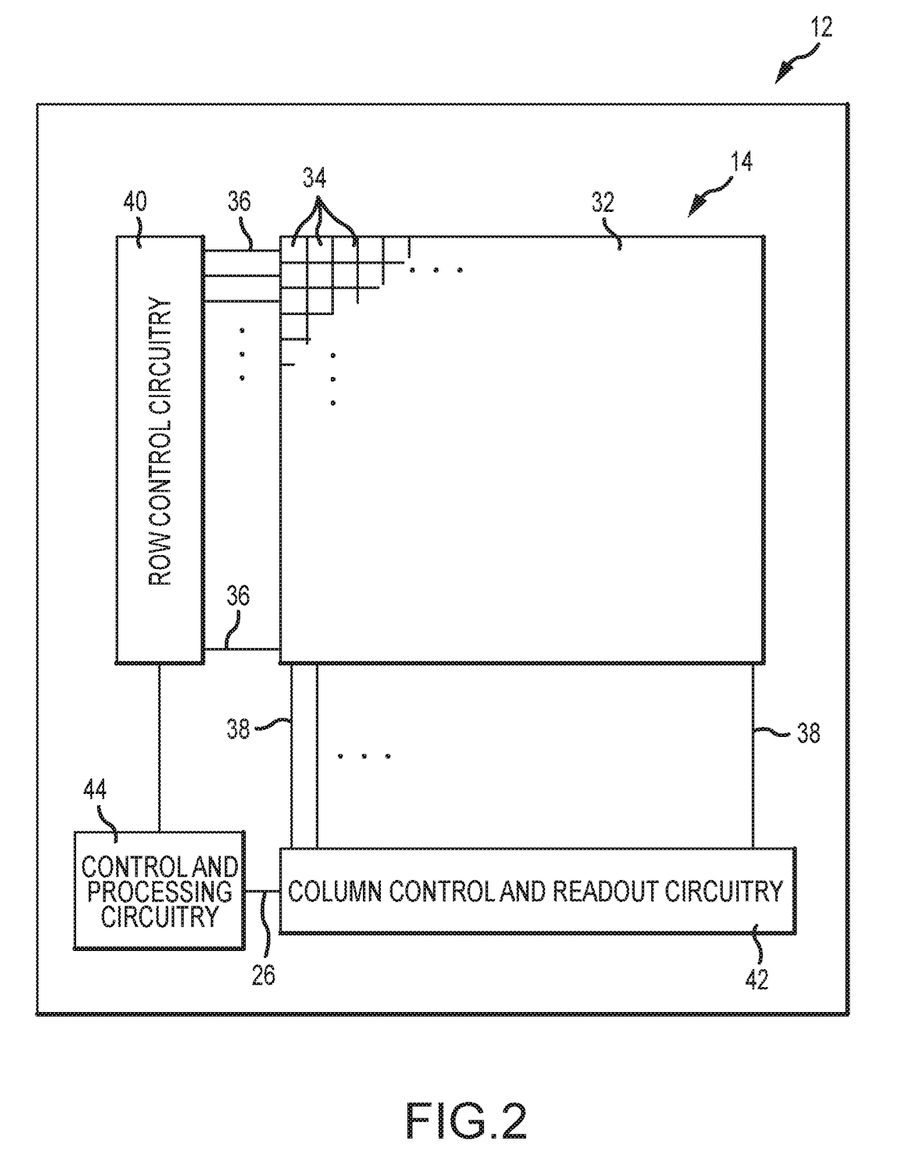
FIG. 2 is a diagram of an illustrative pixel array and associated readout circuitry for reading out image signals in an image sensor in accordance with an embodiment.

An example of an arrangement for camera module 12 of FIG. 1 is shown in FIG. 2. As shown in FIG. 2, camera module 12 includes image sensor 14 and control and processing circuitry 44. Control and processing circuitry 44 may correspond to image processing and data formatting circuitry 16 in FIG. 1. Image sensor 14 may include a pixel array such as array 32 of pixels 34 (sometimes referred to herein as image sensor pixels, imaging pixels, or image pixels 34) and may also include control circuitry 40 and 42. Control and processing circuitry 44 may be coupled to row control circuitry 40 and may be coupled to column control and readout circuitry 42 via data path 26. Row control circuitry 40 may receive row addresses from control and processing circuitry 44 and may supply corresponding row control signals to image pixels 34 over control paths 36 (e.g., dual conversion gain control signals, pixel reset control signals, charge transfer control signals, blooming control signals, row select control signals, or any other desired pixel control signals). Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row control circuitry 40 and image data associated with image pixels 34 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Pixel array 32 may be provided with a color filter array having multiple color filter elements, which allows a single image sensor to sample light of different colors. As an example, image sensor pixels such as the image pixels in array 32 may be provided with a color filter array that allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 34.

If desired, array 32 may be part of a stacked-die arrangement in which pixels 34 of array 32 are split between two or more stacked substrates. In such an arrangement, each of the pixels 34 in the array 32 may be split between the two dies at any desired node within the pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source-follower transistor and a row select transistor, or any other desired node of the pixel circuit.

In general, array 32, row control circuitry 40, column control and readout circuitry 42, and control and processing circuitry 44 may be split between two or more stacked substrates. In one example, array 32 may be formed in a first substrate and row control circuitry 40, column control and readout circuitry 42, and control and processing circuitry 44 may be formed in a second substrate. In another example, array 32 may be split between first and second substrates (using one of the pixel splitting schemes described above) and row control circuitry 40, column control and readout circuitry 42, and control and processing circuitry 44 may be formed in a third substrate.

Figure 3:
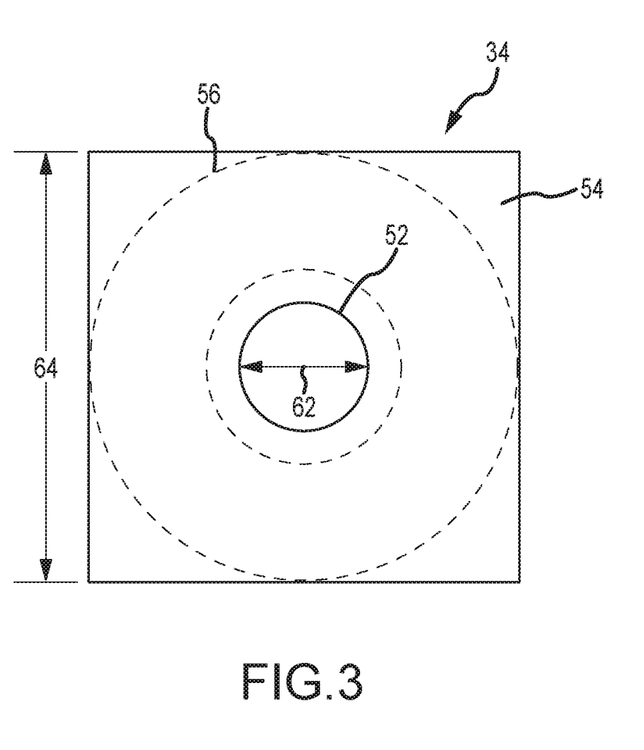
FIG. 3 is a top view of an illustrative imaging pixel that includes a high light-sensitivity sub-pixel that surrounds a low light-sensitivity sub-pixel in accordance with an embodiment.

FIG. 3 is a top view of an illustrative imaging pixel that may be included in an image sensor such as image sensor 14. As shown, imaging pixel 34 has at least two different light collecting areas (LCAs). Pixel 34 may include photosensitive areas (e.g., photodiodes) with associated pixel circuitry used to capture the same spectrum of light. As an example, the pixels 34 may be used to capture red, green, blue, cyan, magenta, yellow, near-infrared, infrared, or any other spectrum of light. A single red, green, blue, cyan, magenta, yellow, near-infrared, infrared, or clear color filter may be formed over the pixel 34. In certain embodiments, the color filter formed over pixel 34 may have areas that pass colored light and areas that are clear (i.e., that pass visible or full-spectrum light outside the visible spectrum).

Pixel 34 of FIG. 3 may include a first sub-pixel 52, which may be referred to as the inner sub-pixel 52. Inner sub-pixel 52 may be completely surrounded by a second sub-pixel 54, which may be referred to as the outer sub-pixel 54. Inner sub-pixel 52 and outer sub-pixel 54 may correspond to n-type doped photodiode regions in a semiconductor substrate. There may be respective sub-pixel circuitry in the substrate such as transfer gates, floating diffusion regions, and reset gates of the pixel 34 that is coupled to the photodiode regions in the sub-pixels 52 and 54. The semiconductor substrate may be a bulk p-type substrate made of silicon, or any other suitable semiconductor material.

A photodiode in inner sub-pixel 52 may have a circular shape at the surface. In other words, the light collecting area of inner sub-pixel 52 is a circular region. At the surface, the inner sub-pixel 52 may have a diameter 62. As an example, the diameter 62 of a photodiode in inner sub-pixel 52 may be 1 micron, but may alternatively be any other dimension without departing from the scope of the present embodiment. Outer sub-pixel 54 may have a square outer boundary and a circular inner boundary at the surface. The area enclosed by the square outer boundary and circular inner boundary of outer sub-pixel 54 shown in FIG. 3 may correspond to the light collecting area of outer sub-pixel 54. As shown in FIG. 3, the length of one of the sides of outer sub-pixel 54 is length 64. As an example, length 64 may be 3 microns, but may alternatively be any other dimension without departing from the scope of the present embodiment. The length 64 is greater than the length 62. Outer sub-pixel 54 is illustrated in FIG. 3 as having a square outer boundary but may alternatively have a non-square rectangular outer boundary or circular outer boundary. Inner sub-pixel 52 is illustrated in FIG. 3 as having a circular boundary but may alternatively have a square boundary or non-square rectangular boundary.

If desired an optional isolation region may be formed between inner sub-pixel 52 and outer sub-pixel 54. The isolation region may separate individual sub-pixels in a given pixel from one another, and may also separate individual sub-pixels in different respective pixels from one another. The optional isolation region may be formed from different types of isolation devices such as trench isolation structures, doped semiconductor regions, metallic barrier structures, or any other suitable isolation device.

Because inner sub-pixel 52 is surrounded by outer sub-pixel 54, inner sub-pixel 52 may sometimes be described as being nested within outer sub-pixel 54. Pixel 34 may sometimes be referred to as a nested image pixel. The inner sub-pixel group and the outer sub-pixel group in a nested image pixel may have the same geometric optical centers. In other words, because the outer sub-pixel group surrounds the inner sub-pixel group symmetrically, the center of the surface of the inner sub-pixel group is the same as the center of the outer sub-pixel group that surrounds the inner sub-pixel group.

The inner sub-pixel 52 may have a lower sensitivity to incident light, and may be referred to as having a lower sensitivity light collecting area compared to outer sub-pixel 54. The respective doping concentrations of inner sub-pixel 52 and outer sub-pixel 54 may be different or they may be the same. As an example, the doping concentrations of photodiode regions in inner sub-pixel 52 may be modified to reduce the sensitivity of inner sub-pixel 52 to light. The lower sensitivity to incident light of inner sub-pixel 52 compared to outer sub-pixel 54 may be a result of the lower light collecting area of inner sub-pixel 52 compared to the light collecting area of outer sub-pixel 54.

The ratio of the light sensitivity of the outer sub-pixel group to the light sensitivity of the inner sub-pixel group may be at least 3 to 1, but could be 5 to 1, 10 to 1, any intermediate ratio, or any larger ratio. In other words, the light sensitivity of the outer sub-pixel group may be at least three times greater than the light sensitivity of the inner sub-pixel group.

One or more microlenses may be formed over the pixel 34 of FIG. 3 to direct light toward the outer sub-pixel 54. The one or more microlenses may be formed over the color filter formed over pixel 34. To direct light toward outer sub-pixel 54, the one or more microlenses may be formed over only outer sub-pixel 54. As shown in FIG. 3, microlens 56 is a toroidal microlens that covers outer sub-pixel 54. The toroidal microlens has an opening that overlaps inner sub-pixel 52 such that the microlens does not overlap inner sub-pixel 52. This enables light to be directed towards the outer sub-pixel. In some embodiments however, the one or more microlenses that direct light toward outer sub-pixel 54 may partially or completely overlap the light collecting area of sub-pixel 52. Directing light toward outer sub-pixel 54 may further increase the sensitivity of the light collecting area of outer sub-pixel 54 relative to the sensitivity of the light collecting area of inner sub-pixel 52. In some embodiments, inner sub-pixel 52 may optionally be covered by a microlens that is formed separately from microlens 56.

Because a larger amount of light incident on pixel 34 is directed to outer sub-pixel 54 than to inner sub-pixel 52, inner sub-pixel 52 is said to have a lower sensitivity light collecting area compared to outer sub-pixel 54. The difference in sensitivity to light of inner sub-pixel 52 and outer sub-pixel 54 enables pixel 34 to be used in high dynamic range applications while using the same integration time for each sub-pixel. If desired, the integration time for each sub-pixel may be different to further increase the dynamic range of the pixel.

Referring to the arrangement of FIG. 3 as including a pixel 34 that has sub-pixels 52 and 54 is merely illustrative. As sub-pixels 52 and 54 have respective photosensitive areas that can be read out separately, sub-pixels 52 and 54 may instead be referred to as pixels 52 and 54. However, for simplicity and consistency, herein we will refer to pixel 34 as having sub-pixels 52 and 54.

Figure 4:
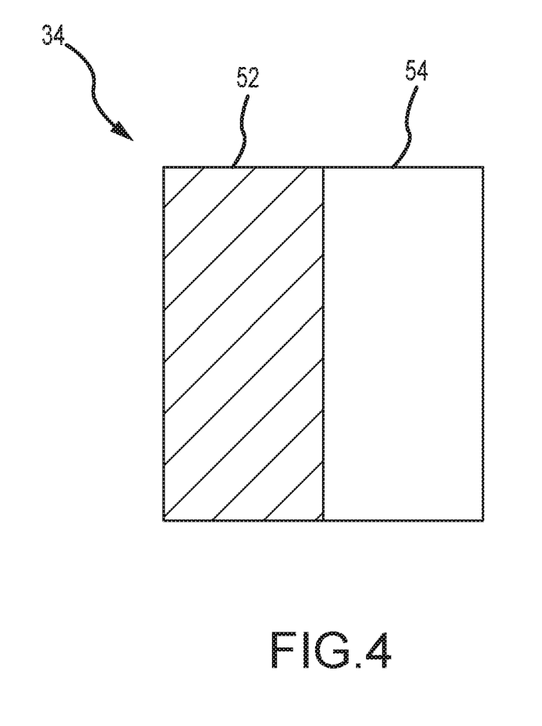
FIG. 4 is a top view of an illustrative imaging pixel with two sub-pixels having different light sensitivities in accordance with an embodiment.

The example of FIG. 3 of inner sub-pixel 52 being surrounded by outer sub-pixel 54 is also illustrative. In general, sub-pixel 52 may have a lower light sensitivity than sub-pixel 54. Sub-pixel 52 may therefore be referred to as low light-sensitivity sub-pixel 52 and sub-pixel 54 may be referred to as high light-sensitivity sub-pixel 54. The low light-sensitivity sub-pixel and high light-sensitivity sub-pixel may have any desired arrangement. For example, the sub-pixels may be side-by-side instead of having sub-pixel 54 surround sub-pixel 52. The sub-pixels may have any desired areas and microlens arrangements. To reflect this, pixel 34 may hereinafter be depicted schematically as in FIG. 4. FIG. 4 shows how pixel 34 has low light-sensitivity sub-pixel 52 and high light-sensitivity sub-pixel 54. FIG. 4 depicts sub-pixels 52 and 54 as side-by-side, but the sub-pixels may have any desired arrangement.

Figure 5:
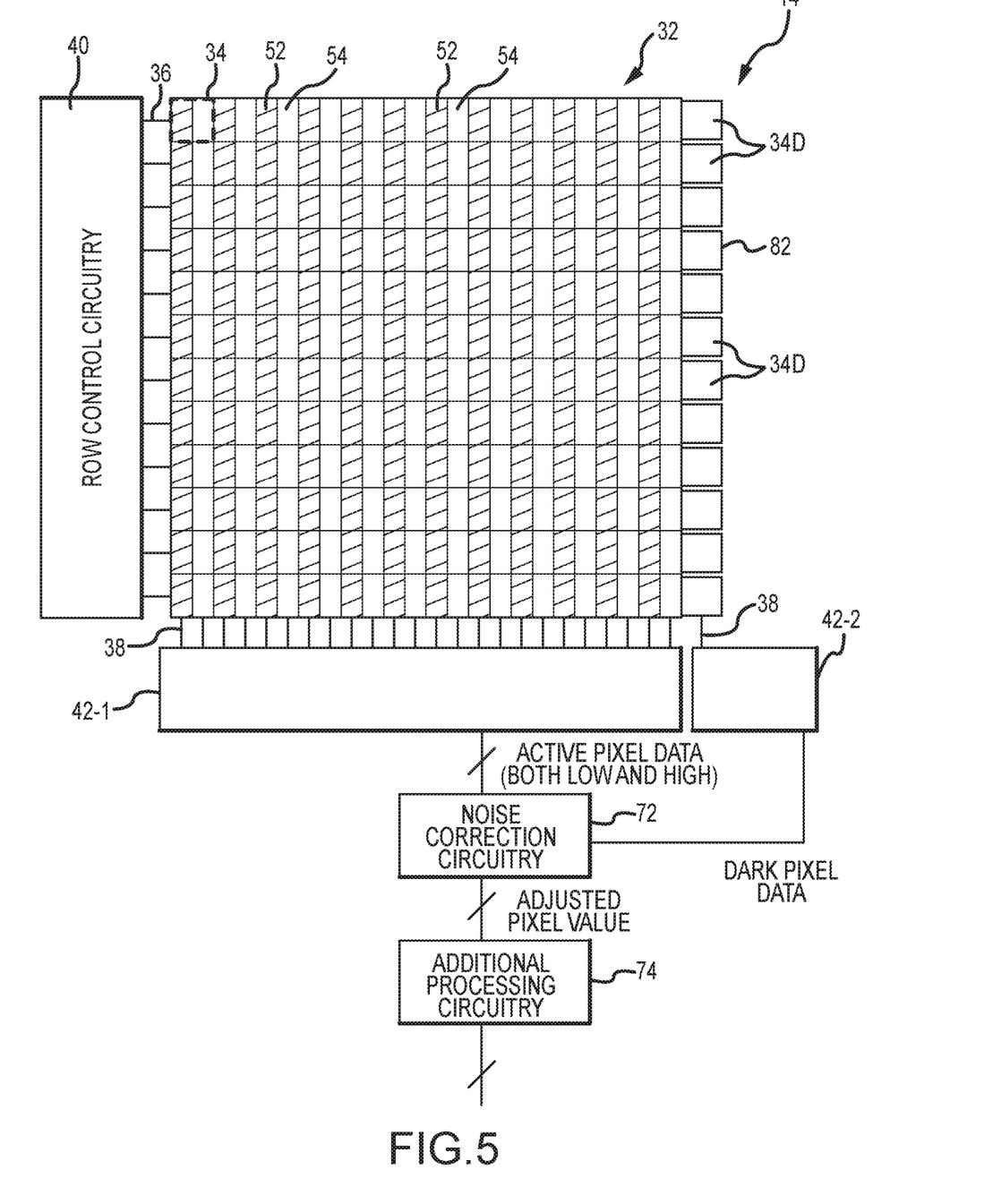
FIG. 5 is a diagram of an illustrative image sensor that includes dark pixels and imaging pixels with two sub-pixels having different light sensitivities in accordance with an embodiment.

To help correct for noise, dark pixels may be incorporated into the image sensor. FIG. 5 is a schematic view of an illustrative image sensor that includes dark pixels (sometimes referred to as reference pixels, optically black pixels, shielded pixels, etc.). As shown in FIG. 5, the pixel array 32 includes a plurality of pixels 34 that each include a low light-sensitivity sub-pixel 52 and a high light-sensitivity sub-pixel 54. As discussed in connection with FIGS. 3 and 4, sub-pixels 52 and 54 may have different light collecting areas, may have different doping concentrations, and/or may be covered by one or more microlenses that direct light towards the high light-sensitivity sub-pixel. Pixels 34 may sometimes be referred to as imaging pixels 34, active pixels 34, or optical pixels 34 (because pixels 34 are sensitive to incident light).

Image sensor 14 also includes dark pixels 34D. Dark pixels 34D may be covered by a shielding material 82 (e.g., metal or any other desired material that is opaque to incident light). The dark pixels 34D may each include a photosensitive area and corresponding readout circuitry (e.g., a transfer transistor, source follower transistor, etc.). However, because the dark pixels are covered by shielding material 82, any generated charge is the result of noise (not the intensity of incident light).

There are numerous options for reading out signals from dark pixels 34D. The signals from dark pixels 34D may be read out before, during, or after the signals from imaging pixels 34 are read out. The dark pixel values of all of the dark pixels (e.g., in multiple rows and/or columns) may be used to correct the imaging pixels. In other words, the average dark pixel level of all of the dark pixels may be used for noise correction. The determined average dark pixel level may be subtracted from a respective optical pixel sample to correct for noise. The example of the average dark pixel level being an average of all of the dark pixels in the image sensor is merely illustrative. Alternatively, the average dark pixel level may instead be an average of a single row of the dark pixels or a single column of the dark pixels (that is used to correct imaging pixels in that row or column).

In FIG. 5, one column of dark pixels is depicted. This example is merely illustrative. In general, any desired number of columns and any desired number of rows of dark pixels may be included in the image sensor. The dark pixels may be coupled to dark pixel column control and readout circuitry 42-2. The optical pixels 34 may be coupled to column control and readout circuitry 42-1. Both column control and readout circuitry 42-1 and 42-2 may include column circuitry such as column amplifiers for amplifying signals read out from the respective optical or dark pixels, sample and hold circuitry for sampling and storing signals read out from the respective optical or dark pixels, analog-to-digital converter circuits for converting read out analog signals to corresponding digital signals, and column memory for storing the read out signals and any other desired data.

Using the signals from dark pixels 34D to correct signals from optical pixels 34 may help correct for noise. However, thermally created carrier generation may vary across the image sensor. The noise from variations in thermally created carrier generation may not be captured by the dark pixels (because the dark pixels are limited to the periphery of the array).

In image sensors with pixels that include high light-sensitivity and low light-sensitivity sub-pixels, the thermal noise of each sub-pixel trends together (e.g., the noise of the low light-sensitivity sub-pixel is proportional to the noise of the high light-sensitivity sub-pixel). Therefore, instead of using a global dark pixel correction value (that is determined by averaging signals from all of the dark pixels) to correct the optical pixel signals, the signal from the low light-sensitivity sub-pixel may be used to correct the signal from the high light-sensitivity sub-pixel. The signal from the low light-sensitivity sub-pixel may be used to correct the signal from the high light-sensitivity sub-pixel in low light level conditions (when most of the low light-sensitivity signal corresponds to noise, not incident light). In high light level conditions, the dark pixel signals may be used to correct the high light-sensitivity sub-pixel for noise.

For example, consider a first optical pixel that has a first low light-sensitivity sub-pixel and a first high light-sensitivity sub-pixel. Each sub-pixel may generate a corresponding signal that is provided to noise correction circuitry 72 (e.g., from column control and readout circuitry 42-1). Noise correction circuitry 72 may also receive dark pixel data from column control and readout circuitry 42-2. Noise correction circuitry 72 may compare the optical pixel data to a threshold. If the optical pixel data is lower than the threshold (indicating low light level conditions) then the signal from the first low light-sensitivity sub-pixel may be used to correct the signal from the first high light-sensitivity sub-pixel. If the optical pixel data is higher than the threshold (indicating high light level conditions), then the dark pixel data may be used to correct the signal from the first high light-sensitivity sub-pixel. After correcting the signal, the adjusted pixel value may be provided to additional processing circuitry 74 as shown in FIG. 5. To summarize, a low-light sensitivity sub-pixel signal may optionally be used to correct a high light-sensitivity sub-pixel signal in low light conditions. This may provide improved thermal noise correction for the image sensor.

Figure 6:
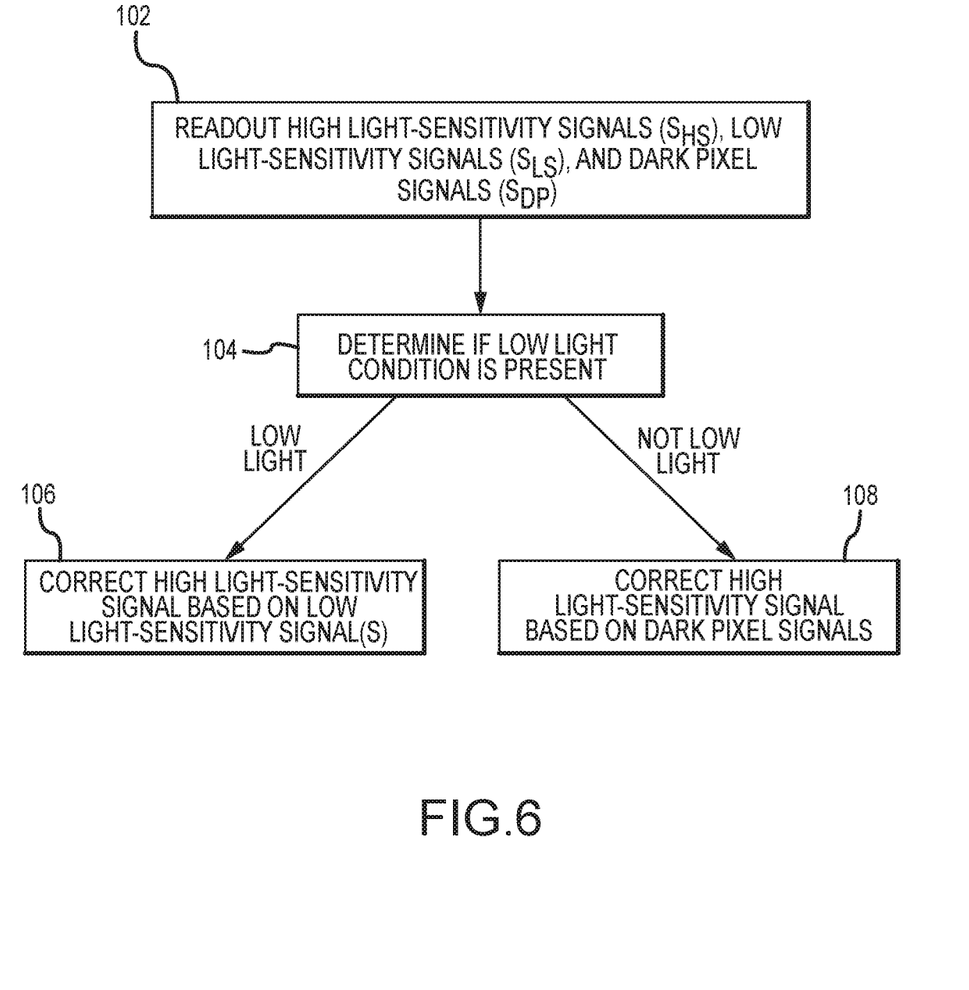
FIG. 6 is a diagram of illustrative method steps for operating an image sensor that includes dark pixels and imaging pixels with two sub-pixels having different light sensitivities such as the image sensor of FIG. 5 in accordance with an embodiment.

FIG. 6 shows illustrative method steps for operating an image sensor that includes dark pixels and imaging pixels with high light-sensitivity and low light-sensitivity readout such as the image sensor of FIG. 5. First, at step 102, high light-sensitivity signals ($S_{HS}$) and low light-sensitivity signals ($S_{LS}$) may be read out from optical pixels 34. As previously discussed, the high light-sensitivity signals may be read out from a high light-sensitivity sub-pixel and the low light-sensitivity signals may be read out from a low light-sensitivity sub-pixel. However, other alternatives may be used to obtain the high and low light-sensitivity signals. For example, some imaging pixels may have a photodiode and an overflow capacitor. The signal from the overflow capacitor may be a low light-sensitivity signal and the signal from the photodiode may be a high light-sensitivity signal. Any desired pixel arrangement may be used to produce the low light-sensitivity signal and the high light-sensitivity signal.

Also at step 102, dark pixel signals ($S_{DP}$) may be read out from dark pixels 34D. The high light-sensitivity signals, low light-sensitivity signals, and dark pixel signals may be provided to noise correction circuitry 72 from column control and readout circuitry 42-1 and 42-2.

Next, it may be determined if low light conditions are present at step 104. This determination may be made for each optical pixel in the image sensor. However, signals from more than one pixel may be used to make the determination.

For example, for a given pixel, the low light-sensitivity signal for that pixel may be compared to a threshold. If the low light-sensitivity signal is less than the threshold, it may be determined that low light conditions are present. If the low light-sensitivity signal is not less than the threshold, it may be determined that low light conditions are not present.

In this example, only the single low light-sensitivity signal is compared to the threshold. However, the low light-sensitivity signals of a number of pixels may instead be averaged. For example, the low light-sensitivity signals of an arbitrarily sized (e.g., m×n) region that includes the given pixel (e.g., the pixel being corrected) may be averaged, and the average low light-sensitivity signal may be compared to the threshold to determine if low light conditions are present. The given pixel being corrected may be at the center of the m×n region that is averaged for low light determination. In one illustrative example, each pixel may be at the center of a 9×9 region of pixels. The average low light-sensitivity signal of the 9×9 region of pixels may be used to determine if there is low light present in that region. The m×n region that is averaged may include two or more pixels, nine or more pixels, sixteen or more pixels, twenty-five or more pixels, forty-nine or more pixels, one hundred or more pixels, etc.

The high light-sensitivity signal may also be used to determine if low light conditions are present. For example, for a given pixel, the high light-sensitivity signal for that pixel may be compared to a threshold. If the high light-sensitivity signal is less than the threshold, it may be determined that low light conditions are present. If the high light-sensitivity signal is not less than the threshold, it may be determined that low light conditions are not present.

In this example, only the single high light-sensitivity signal is compared to the threshold. However, the high light-sensitivity signals of a number of pixels may instead be averaged. For example, the high light-sensitivity signals of an arbitrarily sized (e.g., m×n) region that includes the given pixel (e.g., the pixel being corrected) may be averaged, and the average high light-sensitivity signal may be compared to the threshold to determine if low light conditions are present. The given pixel being corrected may be at the center of the m×n region that is averaged for low light determination. In one illustrative example, each pixel may be at the center of a 9×9 region of pixels. The average high light-sensitivity signal of the 9×9 region of pixels may be used to determine if there is low light present in that region. The use of a 9×9 pixel region is merely illustrative. The m×n region that is averaged may include two or more pixels, nine or more pixels, sixteen or more pixels, twenty-five or more pixels, forty-nine or more pixels, one hundred or more pixels, etc.

As discussed above, only low light-sensitivity signals may be used to determine if low light conditions are present or only high light-sensitivity signals may be used to determine if low light conditions are present. In some embodiments, both low light-sensitivity signals and high light-sensitivity signals may be used to determine if low light conditions are present. For example, the low light-sensitivity signal (either an individual signal or average signal) may be compared to a first threshold and the high light-sensitivity signal (either an individual signal or average signal) may be compared to a second threshold. The first and second thresholds may be different. In some cases, low light conditions may be determined to be present only if the low light-sensitivity signal is less than the first threshold and the high light-sensitivity signal is less than the second threshold. In some cases, low light conditions may be determined to be present if either the low light-sensitivity signal is less than the first threshold or the high light-sensitivity signal is less than the second threshold.

Instead of averaging the signals from a plurality of imaging pixels to compare to a threshold, each signal from a plurality of imaging pixels may be compared to threshold. If any of the signals exceeds the threshold, it may be determined that low light level conditions are not present. Said another way, the maximum signal from the plurality of imaging pixels may be compared to the threshold to determine if the low light conditions are present.

If low light conditions are determined to be present, noise correction circuitry 72 may proceed to step 106. If low light conditions are determined not to be present, noise correction circuitry 72 may proceed to step 108.

At step 106, the high light-sensitivity signals for the optical pixels may be corrected based on the low light-sensitivity signals for the optical pixels. For example, for a given pixel, the low light-sensitivity signal for that pixel may be subtracted from the high light-sensitivity signal for that pixel (e.g., $S_{HS\_CORR}=S_{HS}-S_{LS}$, where $S_{HS\_CORR}$ is the corrected high light-sensitivity signal).

In this example, only the single low light-sensitivity signal of the given pixel is used to correct the high light-sensitivity signal of the given pixel. However, the low light-sensitivity signals of a number of pixels may instead be averaged. For example, the low light-sensitivity signals of an arbitrarily sized (e.g., m×n) region that includes the given pixel (e.g., the pixel being corrected) may be averaged, and the average low light-sensitivity signal may be used to correct the high light-sensitivity signal. The given pixel being corrected may be at the center of the m×n region that is averaged. In one illustrative example, each pixel may be at the center of a 9×9 region of pixels. The average low light-sensitivity signal of the 9×9 region of pixels may be used to correct the high light-sensitivity signal of the pixel in the center of the 9×9 region (e.g., $S_{HS\_CORR}=S_{HS}-S_{LS\_AVE}$, where $S_{LS\_AVE}$ is the average of the low light-sensitivity signals in the m×n region). The m×n region that is averaged may include two or more pixels, nine or more pixels, sixteen or more pixels, twenty-five or more pixels, forty-nine or more pixels, one hundred or more pixels, etc.

Additional corrections may be made when correcting the high light-sensitivity signal based on at least one low light-sensitivity signal. For example, a thermal ratio may be applied to account for different thermal noise generation in large and small pixels (e.g., $S_{HS\_CORR}=S_{HS}-S_{LS\_AVE}\times R_T$, where $R_T$ is a predetermined constant that accounts for the differences in noise generation). An additional correction factor may be used to account for the portion of the low light-sensitivity signal that is caused by received incident light. For example, the sensitivity ratio ($R_s$) between the low and high light-sensitivity signals may be known (e.g., $R_s=S_{LS}/S_{HS}$). When the low light-sensitivity signal is used for correction, some portion of the low light-sensitivity signal is due to charge generated in response to incident light (e.g., a non-noise component). This non-noise component of the low light-sensitivity signal can be estimated using the sensitivity ratio and accounted for when correcting the high light-sensitivity signal (e.g., $S_{HS\_CORR}=S_{HS}-S_{LS\_AVE}\times R_T+R_s\times S_{HS}$).

If desired, the dark pixel data may optionally also be used to correct the high light-sensitivity signal in step 106. For example, a dark pixel offset value (that is equal to the average of one or more dark pixel signals) may also be subtracted from the high light-sensitivity signal.

If low light conditions are not determined to be present, noise correction circuitry 72 may correct the high light-sensitivity signal based on the dark pixel signals at step 108. For example, a dark pixel offset value (that is equal to the average of one or more dark pixel signals) may be subtracted from the high light-sensitivity signal to correct the high light-sensitivity signal (e.g., $S_{HS\_CORR}=S_{HS}-S_{DP\_AVE}$, where $S_{DP\_AVE}$ is the average of one or more dark pixel signals from dark pixels 34D).

The corrected high light-sensitivity signals from steps 106 and 108 may be provided to additional processing circuitry 74. Additional processing circuitry 74 may use the corrected high light-sensitivity signals and the low light-sensitivity signals to determine a representative value for each pixel. The additional processing circuitry may take into account whether or not the low light-sensitivity signal was used to correct the high light-sensitivity signal when determining the representative value for each pixel.

Reference to noise correction circuitry 72 and additional processing circuitry 74 is merely illustrative. If desired, noise correction circuitry 72 and additional processing circuitry 74 may be considered the same circuitry. Noise correction circuitry 72 and additional processing circuitry 74 may both be considered part of column control circuitry 42, for example. Noise correction circuitry 72, additional processing circuitry 74, and column control circuitry 42 may be collectively referred to as processing circuitry.

In FIG. 5, column circuitry 42-1 and 42-2 include analog-to-digital converters. In other words, noise correction circuitry 72 corrects the high light-sensitivity signals in the digital domain. This example is merely illustrative. Noise correction circuitry 72 may alternatively correct the high light-sensitivity signals in the analog domain. In this type of embodiment, noise correction circuitry 72 is interposed between pixels 34 and the analog-to-digital converters of column circuitry 42-1.

The foregoing is merely illustrative of the principles of this invention and various modifications can be made by those skilled in the art. The foregoing embodiments may be implemented individually or in any combination.

What is claimed is:

1. An image sensor comprising:
   an array of imaging pixels, wherein each imaging pixel includes a first sub-pixel that has a first sensitivity to incident light and a second sub-pixel that has a second sensitivity to the incident light, wherein the first sensitivity is higher than the second sensitivity; and
   processing circuitry configured to correct a first signal from the first sub-pixel of a first imaging pixel based at least on a second signal from the second sub-pixel of the first imaging pixel, wherein the processing circuitry is configured to:
      subtract the second signal from the first signal to produce a corrected first signal; and
      determine a representative value for the first imaging pixel based on the corrected first signal and the second signal.

2. The image sensor defined in claim 1, wherein the processing circuitry is configured to compare at least one of the first and second signals to a threshold, and wherein the processing circuitry is configured to correct the first signal based at least on the second signal in response to determining that the at least one of the first and second signals is less than the threshold.

3. The image sensor defined in claim 2, further comprising:
   a plurality of reference pixels that are shielded from the incident light.

4. The image sensor defined in claim 3, wherein the processing circuitry is configured to correct a third signal from the first sub-pixel of a second imaging pixel based on a fourth signal from at least one of the plurality of reference pixels.

5. The image sensor defined in claim 4, wherein the processing circuitry is configured to compare at least one of the third signal and a fifth signal from the second sub-pixel of the second imaging pixel to the threshold, and wherein the processing circuitry is configured to correct the third signal based on the fourth signal in response to determining that the at least one of the third and fifth signals is greater than the threshold.

6. The image sensor defined in claim 1, wherein the processing circuitry is configured to correct the first signal based on an average signal value, wherein the average signal value is an average of signals from second sub-pixels of a plurality of the imaging pixels including the first imaging pixel, wherein the plurality of the imaging pixels is a square grid of imaging pixels, and wherein the first imaging pixel is at a center of the square grid of imaging pixels.

7. The image sensor defined in claim 1, wherein the first sub-pixel of each imaging pixel surrounds the second sub-pixel of that imaging pixel.

8. The image sensor defined in claim 7, wherein each imaging pixel is covered by a toroidal microlens that has an opening that overlaps the second sub-pixel of that imaging pixel.

9. The image sensor defined in claim 1, further comprising:
   a plurality of reference pixels that are shielded from the incident light, wherein the processing circuitry is configured to correct a third signal from the first sub-pixel of a second imaging pixel based on a fourth signal from at least one of the plurality of reference pixels.

10. An image sensor comprising:
    a plurality of imaging pixels that are each configured to generate a high light-sensitivity signal and a low light-sensitivity signal;
    a plurality of dark pixels that are each configured to generate a dark pixel signal; and
    processing circuitry configured to, for each imaging pixel in the plurality of imaging pixels:
       compare a value based on at least one of the high light-sensitivity signal and the low light-sensitivity signal to a threshold;
       when the value is less than the threshold, modify the high light-sensitivity signal for the respective imaging pixel based at least on the low light-sensitivity signal for the respective imaging pixel; and
       when the value is greater than the threshold, modify the high light-sensitivity signal for the respective imaging pixel based on at least one dark pixel signal.

11. The image sensor defined in claim 10, wherein the value is an average of the high light-sensitivity signals for the respective imaging pixel and at least one additional imaging pixel adjacent to the respective imaging pixel.

12. The image sensor defined in claim 10, wherein the value is an average of the low light-sensitivity signals for the respective imaging pixel and at least one additional imaging pixel adjacent to the respective imaging pixel.

13. The image sensor defined in claim 10, wherein modifying the high light-sensitivity signal for the respective imaging pixel based on the at least one dark pixel signal comprises modifying the high light-sensitivity signal for the respective imaging pixel based on an average of all of the dark pixel signals.

14. The image sensor defined in claim 10, wherein modifying the high light-sensitivity signal for the respective imaging pixel based at least on the low light-sensitivity signal for the respective imaging pixel comprises modifying the high light-sensitivity signal for the respective imaging pixel based on an average of the low light-sensitivity signals for the respective imaging pixel and at least one additional imaging pixel adjacent to the respective imaging pixel.

15. The image sensor defined in claim 10, wherein each imaging pixel has a first sub-pixel having a first photosensitive area that generates the high light-sensitivity signal and a second sub-pixel having a second photosensitive area that is smaller than the first photosensitive area that generates the low light-sensitivity signal.

16. The image sensor defined in claim 15, wherein the first and second sub-pixels of each imaging pixel are concentric.

17. A method of operating an image sensor that includes a plurality of imaging pixels with first and second photosensitive areas that generate charge in response to incident light, wherein the image sensor includes dark pixels that are shielded from the incident light, the method comprising:

determining if a level of the incident light is below a threshold for each imaging pixel; and correcting a signal from the first photosensitive area of the respective imaging pixel based at least on a signal from the second photosensitive area of the respective imaging pixel when the level of the incident light is below the threshold for the respective imaging pixel; and correcting a signal from the first photosensitive area of the respective imaging pixel based on an average of signals from the dark pixels when the level of the incident light is not below the threshold for the respective imaging pixel.

* * * * *